INVENTOR:
August SCHWARZKOPF

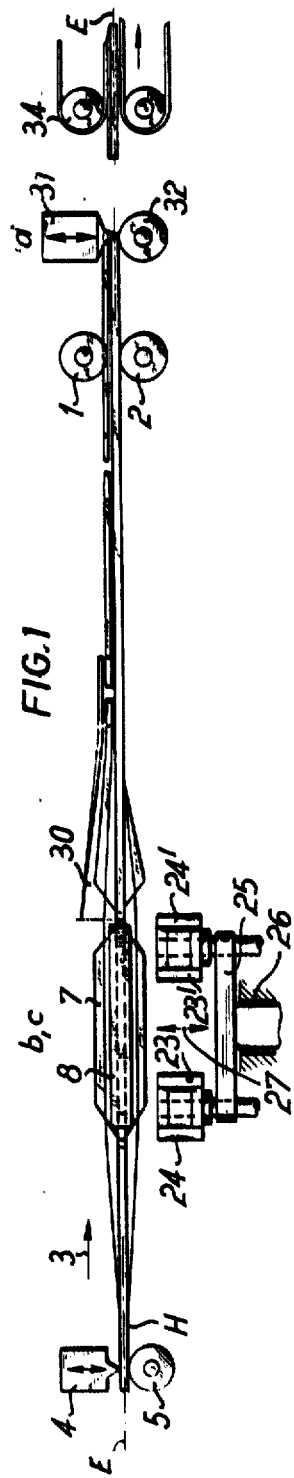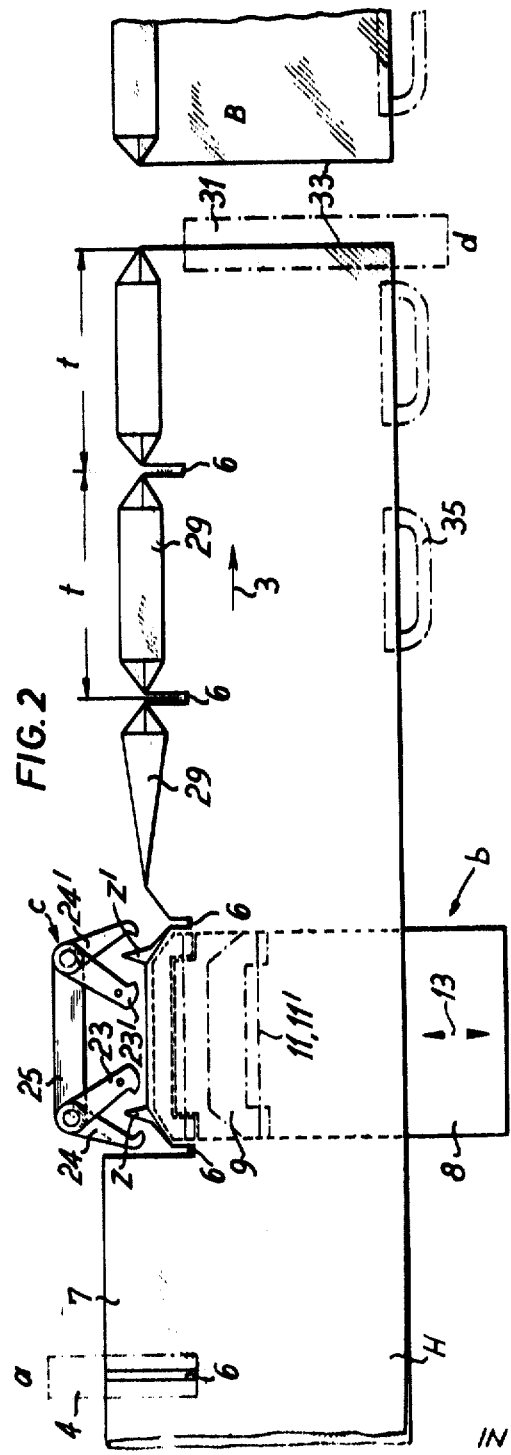

BY
Fleit, Gipple & Jacobson
ATTORNEYS

INVENTOR
August SCHWARZKOPF

Oct. 5, 1971 A. SCHWARZKOPF 3,610,113
METHOD AND APPARATUS FOR MAKING FLAT BAGS HAVING
RECTANGULAR BASES FROM A TWO-PLY WEB OF
THERMOPLASTIC FILM
Filed Feb. 3, 1970 4 Sheets-Sheet 4

INVENTOR:
August SCHWARZKOPF

BY
Fleit, Gipple & Jacobson
ATTORNEYS

United States Patent Office 3,610,113
Patented Oct. 5, 1971

3,610,113
METHOD AND APPARATUS FOR MAKING FLAT BAGS HAVING RECTANGULAR BASES FROM A TWO-PLY WEB OF THERMOPLASTIC FILM
August Schwarzkopf, Lengerich, Westphalia, Germany, assignor to Windmoller & Holscher, Westphalia, Germany
Filed Feb. 3, 1970, Ser. No. 8,329
Claims priority, application Germany, Feb. 3, 1969,
P 19 06 214.7; Aug. 11, 1969, P 19 40 860.7
Int. Cl. B31b *1/00*
U.S. Cl. 93—8 R                    9 Claims

ABSTRACT OF THE DISCLOSURE

Method and apparatus for making flat bags with rectangular bases from a two-ply web of thermoplastic material, the two plies being joined along one longitudinal edge of the web and unconnected along the other edge. The method comprises the steps of: applying separating weld seams to the web at intervals coresponding to the widths of the flattened bags to be made, the seams extending from one longitudinal edge at right angles thereto but only across a part of the web width so as to define the bottom of one bag between each pair of adjacent separating seams; spreading the plies apart from within the web between the separating seams in a direction substantially normal to the web to an extent corresponding to the desired width of each rectangular bag base so that outwardly projecting triangular pockets are formed at each bag bottom adjoining the base; nipping off the triangular pockets by means of further weld seams extending transversely to the separating seams across the remaining part of the web width up to the other longitudinal edge so as to define the full height of the bags and to sever each bag from the web. The apparatus comprises conveying means for intermittently feeding the web in steps equivalent to the width of each bag and a first separating and welding beam reciprocable with respect to the web, the first separating and welding beam being adapted to apply bag bottom defining separating seams to the web when the web is stationary. An expansible former is positioned downstream of the first beam and is adapted to spread the plies apart between the separating seams when the web is stationary. The former is carried by a flat supporting arm that is reciprocable transverse to the longitudinal web edges to move the former in and out of each bag bottom. A pair of separating and welding jaws are movable towards and away from the web and are actuatable to nip off the pockets of each bag bottom when the former is located therein. A second separating and welding beam is located downstream of the former and welding jaws, is movable to an from the web and is adapted when the web is stationary to extend each of the separating seams and sever each bag from the web.

---

The invention relates to a method and apparatus for making flat bags having rectangular bases from a two-ply web of thermoplastic film.

When conventional flat bags are filled, laterally projecting triangular or conical pockets are formed at the corners of the base. These pockets prove cumbersome when handling the bags and they interfere with the upright positioning of the filled bags. It has therefore already been proposed to weld and sever corresponding portions of the bag material by means of seams extending perpendicular to the side edges of the bag. These welded and severed seams cause the bag to assume a shape with a rectangular base during filling, the narrow sides of the base being formed by the said seams. The bags can now be readily stood up and very closely to one another to save space.

The invention aims to provide a method and apparatus for making flat bags with rectangular bases and possibly also with carrying handles in an automatic manner and above all more economically than hitherto and in large numbers. Use is made of a method in which the flat bags are made from intermittently moved two-ply plastics web formed by folding a single-layer film longitudinally or by slitting a tubular film longitudinally and then laying it flat, the single foldline along one of the longitudinal edges of the web being eventually located at the bottoms of the bags of which the sides are formed by separating weld seams which are applied transversely to the web. In this connection it should be understood that such separating weld seams are formed by welding beams which not only have the effect of welding the superposed plies together but they also cut through the superposed plies substantially centrally along the seam so that the web is parted or severed with the plies remaining welded to one another to each side of the parting or severing cut.

According to the invention, a method of making flat bags with rectangular bases from a two-ply web of thermoplastic film, the two plies being joined along one longitudinal edge of the web and unconnected along the other edge, comprises the steps of:

(a) Applying separating weld seams to the web at intervals corresponding to the widths of the flattened bags to be made, the seams extending from the said one longitudinal edge at right-angles thereto but only across part of the web width so as to define the bottom of one bag between each pair of adjacent said separating seams (b) Spreading the plies apart from within the web between the said separating seams in a direction substantially normal to the web to an extent corresponding to the desired breadth of each rectangular bag base, whereby outwardly projecting triangular pockets are formed at each bag bottom adjoining the base thereof (c) Nipping the triangular pockets off by means of further weld seams extending transversely to the said separating seams (d) Extending the said separating seams across the remaining part of the web width up to the said other longitudinal edge so as to define the full height of the bags and so as to sever each bag from the web.

Since the separating weld seams that are first applied are only intended to define the bottoms of the bags, they can be kept fairly short, the rest of the ply material which eventually completes the bags to their full height initially remaining unwelded. It is therefore possible to locate between the plies but stopping short of the existing seams an expansible former which does not move lengthwise of the web. If the web is now fed intermittently in steps corresponding to the desired width of the bags, i.e. corresponding to the spacing of the adjacent short separating weld seams, and if the former is at this stage collapsed, the unwelded portions of the plies will sweep over the former. After each feeding step, the web will be located so that the former lies opposite one of the bag bottoms defined between the seams and only a short reciprocating stroke is required to introduce the former into the bag bottom, whereafter the former is expanded to spread the bag bottom to the desired breadth of its rectangular base. The method of the invention therefore avoids the execution of long strokes for the spreading tool or former, this being a prerequisite for achieving a high production rate. Also, since the base of each bag is formed and the triangular pockets are nipped off before the individual bags have been completed and severed from the web, the production cost will be lower than if there were two separate machines for achieving the same end effect, in which case the completed bags would have to be stacked before being fed to the second machine. Still further, by means of the invention it is possible to make carrier bags in which handles are welded to the mouths of the bags in a fully automatic manner even before the mouths are fully defined.

An apparatus according to the invention for performing the aforementioned method comprises conveying means for intermittently feeding the web in steps equivalent to the width of each bag, a first separating and welding beam reciprocable to and from the web for applying the said bag bottom-defining separating seams to the web whilst the latter is stationary, an expansible former downstream of the first beam for spreading the plies apart between the said separating seams when the web is stationary, the former being carried by a flat supporting arm that is reciprocable transversely to the longitudinal web edges to move the former into and out of each bag bottom, a pair of separating and welding jaws movable towards and away from the web and actuatable to nip off the said triangular pockets of each bag bottom when the former is located therein, and a second separating and welding beam which is located downstream of the former and jaws, is movable to and from the web and is effective, when the web is stationary, to extend each of said separating seams and sever each bag from the web.

The former may comprise two flaps hinged to the supporting arm about axes which are symmetrical to the medial plane of the web and extend parallel to the direction in which the web is fed, means being provided for simultaneously pivoting the flaps from a collapsed position in which they are parallel and suitable for insertion in and removal from each bag bottom to an expanded position at which they subtend an angle to one another and spread the plies of the web apart. The pivoting means for the flaps may comprise a rack that is mounted for displacement lengthwise of the supporting arm and is provided with two sets of teeth which engage respective pinions on the pivots of the flaps. Alternatively, a cam plate which has cam slots formed in it and which is mounted for displacement lengthwise of the supporting arm may cooperate with cam follower arms that are carried by the flaps and which cause the flaps to swing as the cam plate is reciprocated.

Instead of flaps, the former may comprise pairs of fingers at the ends of respective shafts which extend along the supporting arm in the medial plane of the web, the shafts of each pair of fingers being rotatable in opposite directions to move the fingers from a collapsed position, in which they are parallel, to an expanded position, at which they subtend an angle to one another.

Any of these possible constructions for the former can result in a flat construction that will not cause the plies of the web to be separated excessively as they sweep over the former during feeding of the web.

In a preferred form of the invention, the pairs of jaws are in the form of welding tongs mounted on a common support that is movable towards and away from the web, i.e. towards and away from the triangular pockets that are to be nipped off, the arrangement being such that the support moves the tongs transversely to the feeding plane of the web, i.e. lengthwise of the bases of the triangular pockets. This helps to avoid disruptions during the welding process if the triangular pockets happen to be disposed obliquely because the disposition of the base of each triangular pocket is determined by the former and will remain unchanged even if the pocket is oblique.

If carrier bags are to be made, means are provided downstream of the pairs of jaws and upstream of the second separating and welding beam for applying bag handles to the plies at the unconnected longitudinal edge of the web. At this location, i.e. downstream of the former, the handle applying means will not interfere with formation of the rectangular base.

Examples of the invention are illustrated in the accompanying drawings wherein:

FIG. 1 is a diagrammatic elevation of an apparatus for making flat bags having rectangular bases;

FIG. 2 is a plan view of the web showing the various stages in the production of the bags by means of the FIG. 1 apparatus;

Figure 3:
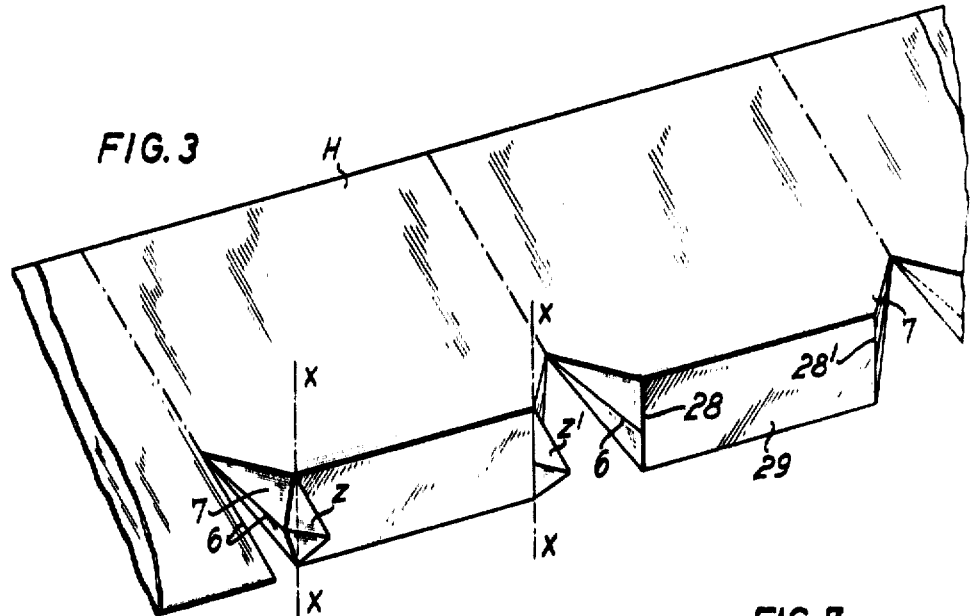
FIG. 3 is a perspective view of the web showing two stages in the production of the bags by means of the FIG. 1 apparatus.

Referring to FIGS. 1 and 2, the apparatus for making flat bags with rectangular bases comprises a pair of feed rollers 1, 2 for intermittently feeding a web H of thermoplastic film which has been longitudinally folded to double thickness. The web is taken from a supply reel (not shown) and progressively taken through processing stations $a$, $b$, $c$, and $d$. The feeding direction is indicated by the arrow 3 in FIG. 1 and each feeding step moves the web H by a distance equal to the width $t$ of each bag to be made.

At the processing station $a$, which is a welding station, there is a short separating and welding beam 4 which is reciprocatable towards and away from the web H and which, when the web is stationary, is applied normally to the web at the longitudinally edge thereof which is formed by the foldline in the plastics film. The separating and welding beam 4 may be of any known construction. Its cutting edge is preferably electrically heated. The beam 4 is backed by a backing tool such as a backing roller 5 which supports the web against the pressure of the beam. Whilst the web is stationary, the beam 4 applies separating weld seams 6 thereto which extend a short distance from the folded edge of the web at right-angles to the foldline so as to define only the bottoms 7 of the bags to be made.

The processing station $b$ and $c$ are located downstream of the beam 4 at a spacing equivalent to one bag width $t$ (as illustrated) or equivalent to a multiple thereof. At the processing station $b$, a flat supporting arm 8 is located between the two plies of the web at the longitudinal edge thereof which is formed by the unconnected ends of the plies. The supporting arm 8 carries spreading equipment 9 which is illustrated in more detail in FIGS. 4 to 6. The spreading equipment comprises an expansible former, in this case two flaps 10, 10' which can be swung from the FIG. 4 collapsed position in which they are parallel to one another to the FIG. 6 expanded position in which they subtend an angle to one another, such swinging or pivoting taking place about axes 11, 11' which are parallel to the feeding direction 3 of the web and which are symmetrical to the medial plane E—E of the web (see FIG. 1). The supporting arm 8 is displaceable along stationary guide rails 12, 12' at right-angles to the web H and is reciprocated in the direction of the arrow 13 in FIG. 2 by any suitable means whilst the web is stationary. At one side of the supporting arm 8, each flap is connected to the outer end of a drive pin 14 or 14' and at the other side it is rotatable about a pivot pin 15 or 15'. The drive and pivot pins are rotatably mounted in the supporting arm 8. At the ends of the drive pins 14, 14' which face one another, the drive pins are equipped with pinions 16, 16' which engage in racks 17 and 17', respectively. The racks are carried by a common thrust bar 18 which is displaceable in the supporting arm 8 and is provided with a projecting lug 20 in the vicinity of an abutment 19. A compression spring 21 interposed between the thrust bar 18 and the supporting arm 8 holds the flaps 10, 10' in their parallel position of FIG. 4 but permits them to be swung to the FIG. 6 position as soon as the lug 20 strikes the abutment 19 during reciprocating motion of the supporting arm 8, whereby the thrust bar 18 and the racks 17, 17' thereon are held tight so that the pinions 16, 16' that are carried along with the supporting arm 8 will roll along the racks. As indicated by the arrows 22 in FIG. 4, the abutment 19 can be reciprocated by any suitable means such as a thrust cam so as to control the spreading or expanding movement of the flaps 10, 10' relatively to the stroke of the supporting arm 8. In this way expansion of the flaps can effect spreading of the plies of the web when the flaps have been introduced in the bag bottom 7.

During feeding of the web H, the supporting arm 8 is located in the position shown in chain-dotted lines in FIG. 2 where it is located between the two plies of the web but only to such an extent that the flaps constituting the former of the spreading equipment do not project into a bag bottom 7 defined between two adjacent separating weld seams 6. Also during feeding of the web H, the flaps 10, 10' are in the collapsed position of FIG. 4. When the web is stationary, the supporting arm 8 is advanced towards the foldline of the web so that the flaps 10, 10' can be introduced into a bag bottom 7 that will be aligned with the supporting arm 8. During such advancing movement of the supporting arm, the abutment 19 will actuate the means 16, 16', 17, 17' and 18 for expanding the former, i.e. to swing the flaps 10, 10' to their FIG. 6 position. Such expansion causes the bag bottom 7 to be spread from the inside and substantially normal to the plane of the web by an amount corresponding to the breadth of the rectangular base that is to be formed in the bag bottom. This condition is shown in chain-dotted lines at the left-hand side of FIG. 6 and, more clearly, at the left-hand side of FIG. 3 from which it can be seen that two peaks or triangular pockets Z and Z' are formed by the expansion of the former.

The processing station $c$ consists of two electrically heated separating and welding jaws 23, 23' with associated backing jaws 24, 24' located in alignment with the station $b$ and arranged in pairs on a support 25 at a spacing equivalent to the pockets Z and Z' which are formed. The support 25 is movable towards and away from the web H in a direction normal to the plane of the web and it will be evident from FIG. 2 that the jaws 23, 23', 24, 24' are in the form of welding tongs. The tongs are opened and closed in any suitable known means which are not illustrated. Movement of the support 25 takes place in the direction of the arrows 27 in FIG. 1 along the machine frame 26 so that the tongs will travel normal to the plane of the web parallel to the bases $x$—$x$ (see FIG. 3) of the triangular pockets Z, Z'.

The separating and welding jaws engage the triangular pockets Z, Z' at their respective bases and sever them from the bag bottom 7 whilst simultaneously forming weld seams 28, 28'. The base of each bag bottom will now have its final rectangular shape as shown at 29 in FIG. 3. The seams 28, 28' formed by the jaws extend at right-angles to the short seams 6 that were formed by the beam 4 and that will finally form part of the bag sides. The supporting arm 8 as well as the welding tongs are thereafter retracted from the shaped bag bottom, at which time the abutment 19 in co-operation with the spring 21 will cause the flaps 10, 10' to collapse.

During the next feeding step of the web H, the shaped rectangular base 29 is passed along a deflector 30 which causes the base to be turned through 90° so as to come to lie in the plane of the web.

The processing station $d$ comprises a welding and separating beam 31 spaced downstream from the beam 4 at a distance equal to a multiple of each bag width $t$. The beam 31 is disposed parallel to the beam 4 over the parts of the web that have not yet been provided with separating weld seams 6. The beam 31 is backed by a backing roller 32 and is reciprocable to and from the web normal to the plane of the latter. It is effective to form a separating weld seam 33 which constitutes an extension of the short seam 6 over the remainder of the width of the web, thereby to complete the side of each bag B and sever each bag from the web (FIG. 2). The finished bag B is engaged by the double belt conveyor 34 which moves at a higher speed than the feed rollers 1, 2 and conveys the bag to a depositing or stacking station (not shown).

If the bag B is to have carrying handles, then known equipment is interposed between the stations $c$ and $d$ for the purpose of applying pairs of handles 35 to the web whilst the latter is stationary. As shown in chain-dotted lines in FIG. 2, each handle 35 is located centrally between two adjacent seams 6 and it is welded or adhered to a respective ply of the web so as to be disposed either inside or outside the mouth of the finished bag.

Figure 7:
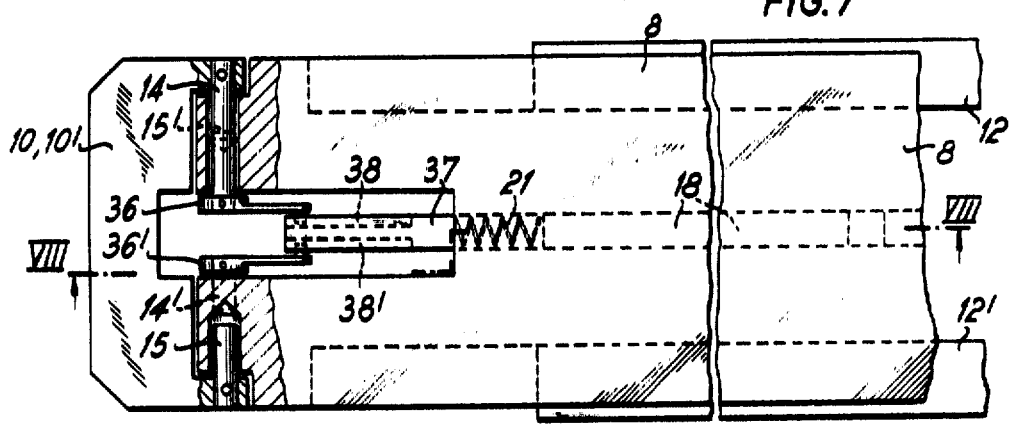
FIG. 7 is a part-sectional plan view of modified spreading equipment taken on the line VII—VII in FIG. 8.
Figure 8:
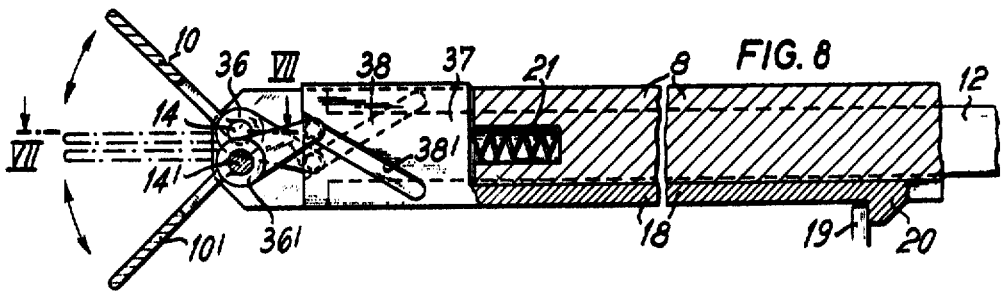
FIG. 8 is a longitudinal section on the line VIII—VIII in FIG. 7.
Figure 4:
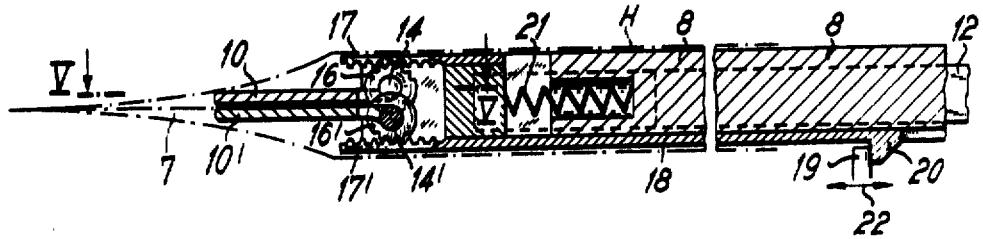
FIG. 4 is a longitudinal section of spreading equipment of the FIG. 1 apparatus, the section being taken on the line IV—IV in FIG. 5.
Figure 5:
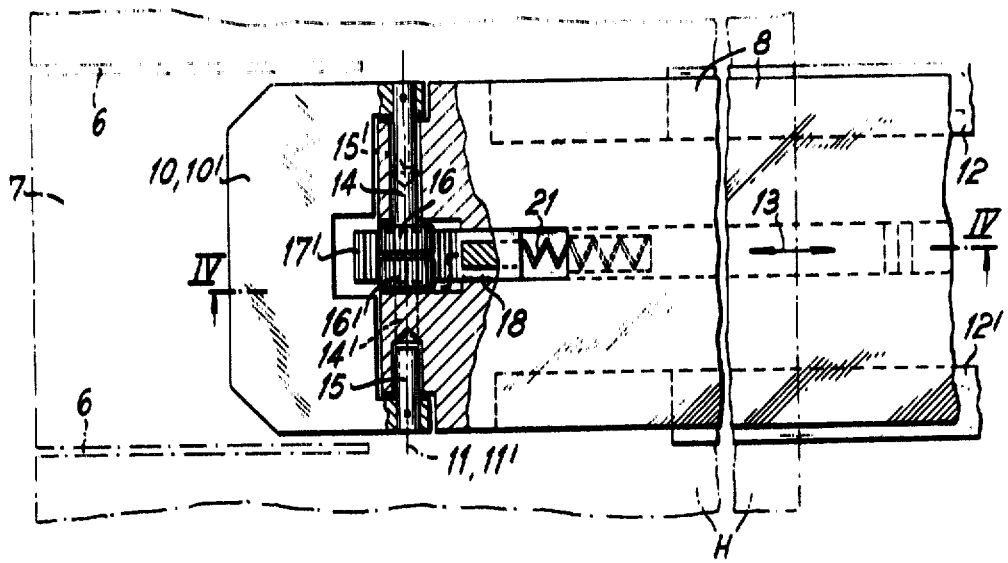
FIG. 5 is a part-sectional plan view of the FIG. 4 spreading equipment, the part in section being taken on the line V—V in FIG. 4.
Figure 6:
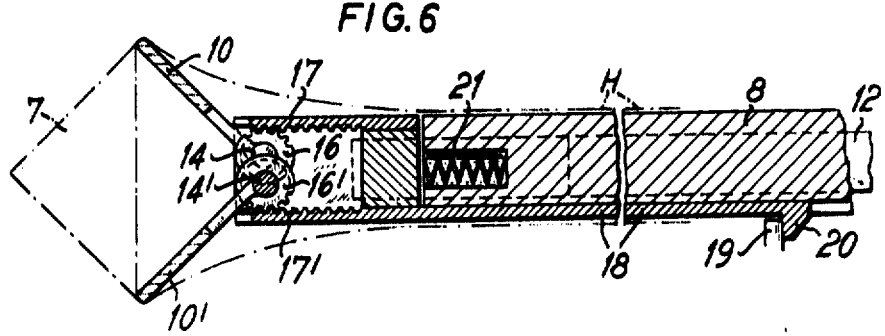
FIG. 6 is a longitudinal section similar to FIG. 4 but showing an expansible former in its expanded condition.

Instead of the FIGS. 4 to 6 rack and pinion drive for pivoting the flaps 10, 10', a cam plate may be employed as shown in FIGS. 7 and 8. The difference in FIGS. 7 and 8 is that the racks 17, 17' have been replaced by a cam plate 37 fixed to the thrust bar 18. The cam plate 37 has two sides, each of which is formed with an inclined cam slot or groove 38 or 38'. The pinions 16, 16' of FIGS. 4 to 6 are replaced in FIGS. 7 and 8 by levers 36, 36' on the respective drive pins 14, 14'. The levers carry cam follower pins or rollers which are engaged in the cam slots. As the cam plate 37 is reciprocated by means of the thrust bar 18, the levers 36, 36' are caused to rotate and thereby also turn the flaps 10, 10'.

Figure 9:
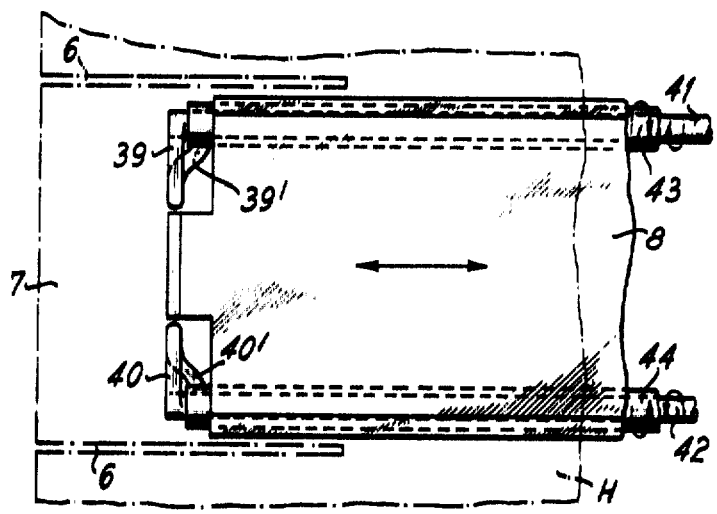
FIG. 9 is a plan view of a still further form of spreading equipment.
Figure 10:
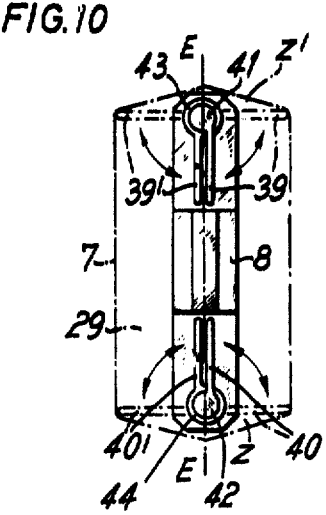
FIG. 10 is a front elevation of the FIG. 9 equipment.

A different kind of expansible former for spreading each bag bottom 7 is illustrated in FIGS. 9 and 10. It comprises two pairs of spreading fingers 39, 39' and 40, 40' at the leading end of the supporting arm 8. One finger 39 or 40 of each pair of fingers is carried by a shaft 41 or 42 respectively. The other finger is carried by a hollow shaft 43 or 44 coaxial with the shaft 41 or 42, respectively. The shafts 41, 42, 43 and 44 lie in the plane E—E of the web, are carried by the supporting arm 8 and extend at right-angles to the feeding direction of the web. By turning the shafts 41, 43 or 42, 44 in opposite directions, the fingers of each pair are rotated from a position at which they are parallel and collapsed and can be conveniently inserted in a bag bottom 7 to a position in which they are parallel and expanded (chain-dotted lines in FIG. 10) to spread the plies of the web and form the rectangular base 29 with triangular pockets Z, Z'. After welding and severing the triangular pockets, the fingers of each pair are collapsed again and the supporting arm 8 is withdrawn sufficiently to permit clear passage of the short seams 6.

I claim:

1. A method of making flat bags with rectangular bases from a two-ply web of thermoplastic film, the two plies being joined along one longitudinal edge of the web and unconnected along the other edge, wherein:

(a) separating weld seams are applied to the web at intervals corresponding to the widths of the flattened bags to be made, the seams extending from the said one longitudinal edge at right-angles thereto but only across part of the web width so as to define the bottom of one bag between each pair of adjacent said separating seams, (b) the plies are spread apart from within the web between the said separating seams in a direction substantially normal to the web to an extent corresponding to the desired breadth of each rectangular bag base, whereby outwardly projecting triangular pockets are formed at each bag bottom adjoining the base thereof, (c) the triangular pockets are nipped off by means of said separating seams, (d) the said separating seams are extended across the remaining part of the web width up to the said other longitudinal edge so as to define the full height of the bags and so as to sever each bag from the web.

2. Apparatus for performing the method of claim 1 comprising conveying means for intermittently feeding the web in steps equivalent to the width of each bag, a first separating and welding beam reciprocable to and from the web for applying the said bag bottom-defining separating seams to the web whilst the latter is stationary, an expansible former downstream of the first beam for seams when the web is stationary, the former being carried by a flat supporting arm that is reciprocable transversely to the longitudinal web edges to move the former into and out of each bag bottom, a pair of separating and welding jaws movable towards and away from the web and actuatable to nip off the said triangular pockets of each bag bottom when the former is located therein, and a second separating and welding beam which is located downstream of the former and jaws, is movable to and from the web and is effective, when the web is stationary, to extend each of said separating seams and sever each bag from the web.

3. Apparatus according to claim 2, wherein the former comprises two flaps hinged to the supporting arm about axes which are symmetrical to the medial plane of the web and extend parallel to the direction in which the web is fed, means being provided for simultaneously pivoting the flaps from a collapsed position in which they are parallel and suitable for insertion in and removal from each bag bottom to an expanded position at which they subtend an angle to one another and spread the plies of the web apart.

4. Apparatus according to claim 3, wherein the flaps are provided with drive pins carrying pinions which engage respective racks that are mounted for displacement lengthwise of the supporting arm.

5. Apparatus according to claim 3, wherein the flaps are provided with cam follower arms engaged in cam slots of a cam plate that is mounted for displacement lengthwise of the supporting arm.

6. Apparatus according to claim 2, wherein the former comprises pairs of fingers at the ends of respective shafts which extend along the supporting arm in the medial plane of the web, the shafts of each pair of fingers being rotatable in opposite directions to move the fingers from a collapsed position to an expanded position.

7. Apparatus according to claim 2, wherein the pairs of jaws are in the form of welding tongs mounted on a common support that is movable towards and away from the web.

8. Apparatus according to claim 7, wherein the support is mounted to move the tongs transversely to the feeding plane of the web.

9. Apparatus according to claim 2, including means downstream of the pairs of jaws and upstream of the second separating and welding beam for applying bag handles to the plies at the unconnected longitudinal edge of the web.

References Cited
UNITED STATES PATENTS

| | | | |
|---|---|---|---|
| 2,381,850 | 8/1945 | Williams | 93—355 B |
| 3,150,573 | 9/1964 | Piazze | 93—355 B |

BERNARD STICKNEY, Primary Examiner

U.S. Cl. X.R.

93—35 SB, 59 CE